United States Patent [19]

Bogart et al.

[11] Patent Number: 5,239,625
[45] Date of Patent: Aug. 24, 1993

[54] APPARATUS AND METHOD TO MERGE IMAGES RASTERIZED AT DIFFERENT RESOLUTIONS

[75] Inventors: Mitchell Bogart, Sharon; Stefan Decuypere, Bedford; Andrew Masia, West Newbury; Matthew Proujansky, Lexington, all of Mass.

[73] Assignee: Rampage Systems, Inc., Waltham, Mass.

[21] Appl. No.: 664,763

[22] Filed: Mar. 5, 1991

[51] Int. Cl.$^5$ .......................... G06F 3/153; G06F 15/34
[52] U.S. Cl. ................................... 395/128; 395/135; 340/728; 382/5 C
[58] Field of Search .......................... 364/521, 518, 522; 340/731, 798, 799, 747, 750, 728; 382/44, 47, 56; 395/128, 135

[56] References Cited

U.S. PATENT DOCUMENTS

| | | | |
|---|---|---|---|
| 3,272,918 | 9/1966 | Koll et al. | 358/75 |
| 3,657,472 | 4/1972 | Taudt et al. | 178/67 A |
| 3,688,033 | 8/1972 | Hell et al. | 178/15 |
| 3,725,574 | 4/1973 | Gast | 178/67 R |
| 3,742,129 | 6/1973 | Roberts et al. | 178/54 C R |
| 3,904,816 | 9/1975 | Taudt et al. | 178/6 |
| 3,911,480 | 10/1975 | Brucker | 358/75 |
| 3,922,484 | 11/1975 | Keller | 178/6 |
| 3,997,911 | 12/1976 | Perriman et al. | 358/75 |
| 4,084,183 | 4/1978 | Keller et al. | 358/73 |
| 4,149,195 | 4/1979 | Gast | 358/283 |
| 4,350,996 | 9/1982 | Rosenfeld | 358/75 |
| 4,456,924 | 6/1984 | Rosenfeld | 358/75 |
| 4,476,497 | 10/1984 | Oshikoshi et al. | 358/298 |
| 4,496,989 | 2/1985 | Hirosawa | 358/75 |
| 4,499,489 | 2/1985 | Gall et al. | 358/75 |
| 4,500,919 | 2/1985 | Schreiber | 358/78 |
| 4,668,995 | 5/1987 | Chen et al. | 358/282 |
| 4,675,743 | 6/1987 | Riseman et al. | 358/263 |
| 4,677,571 | 6/1987 | Riseman et al. | 364/519 |
| 4,684,936 | 8/1987 | Brown et al. | 340/721 |
| 4,686,655 | 8/1987 | Hgatt | 367/59 |
| 4,692,757 | 9/1987 | Tsuhara et al. | 340/721 |
| 4,785,391 | 11/1988 | Apley et al. | 364/518 |
| 4,849,822 | 7/1989 | Sing | 358/443 |
| 4,862,154 | 8/1989 | Gonzalez-Lopez | 358/462 |
| 4,868,764 | 9/1989 | Richards | 364/518 |
| 4,876,600 | 10/1989 | Pietzsch et al. | 358/183 |
| 4,903,145 | 2/1990 | Funada | 358/462 |
| 4,930,007 | 5/1990 | Sugiara et al. | 358/75 |
| 4,931,956 | 6/1990 | Stapleton | 364/521 |
| 4,942,479 | 7/1990 | Kanno | 358/448 |
| 4,947,260 | 8/1990 | Reed | 358/447 |
| 5,016,193 | 5/1991 | Stone et al. | 364/518 |
| 5,053,983 | 10/1991 | Hgatt | 364/724.03 |
| 5,065,346 | 11/1991 | Kawai et al. | 395/128 |
| 5,099,435 | 3/1992 | Collins et al. | 395/150 |

FOREIGN PATENT DOCUMENTS

| | | | |
|---|---|---|---|
| 342845 | 4/1984 | European Pat. Off. | |
| 1407487 | 6/1985 | United Kingdom | |

OTHER PUBLICATIONS

Scitex HandShake Foreign File Transfer Protocol.
ANSI IT8.1-1988.
ANSI IT8.2-1988.
ANSI IT8.3-198x.
ANSI IT8.5-1990.

*Primary Examiner*—Phu K. Nguyen
*Attorney, Agent, or Firm*—Hale and Dorr

[57] ABSTRACT

An input image containing high resolution images and low resolution images is rasterized twice, once at a high resolution and once at a low resolution. The rasterized images are represented in compressed form using a run-code encoding technique. The low resolution images are rasterized during the low resolution rasterization and are scaled to the output resolution. The high resolution images are rasterized during the high resolution rasterization. The two rasterizations are merged in hardware, producing a composite output image which contains low resolution image elements and high resolution image elements.

63 Claims, 11 Drawing Sheets

TWO BYTE RUN-CODE

| BYTE 1 | | BYTE 0 | 22 |
|---|---|---|---|
| 0 | REPEAT PIXEL COUNT | INTENSITY | |
| (BIT 7) | (BITS 6-0) | (BITS 7-0) | |

FOUR BYTE RUN-CODE

| BYTE 3 | BYTE 2 | 24 |
|---|---|---|
| REPEAT PIXEL COUNT (8 MSB'S *) | REPEAT PIXEL COUNT (MIDDLE BITS) | |
| (BITS 7-0) | (BITS 7-0) | |

| BYTE 1 | | BYTE-0 |
|---|---|---|
| 1 | REPEAT PIXEL CT (7 LSB'S *) | INTENSITY |
| (BIT 7) | (BITS 6-0) | (BITS 7-0) |

\* MOST SIGNIFICANT BIT (MSB)
LEAST SIGNIFICANT BIT (LSB)

END LINE CODE

| BYTE 1 | BYTE 0 | | 26 |
|---|---|---|---|
| 0 | REPEAT-LINE COUNT | X ** | 1 |
| (BITS 7-0) | (BITS 7-2) | | (BIT-0) |

END PAGE CODE

| BYTE 1 | BYTE 0 | | 28 |
|---|---|---|---|
| 0 | X X X X X X X ** | | 0 |
| (BITS 7-0) | | | (BIT 0) |

\*\* X = DON'T CARE

*FIG. 2*

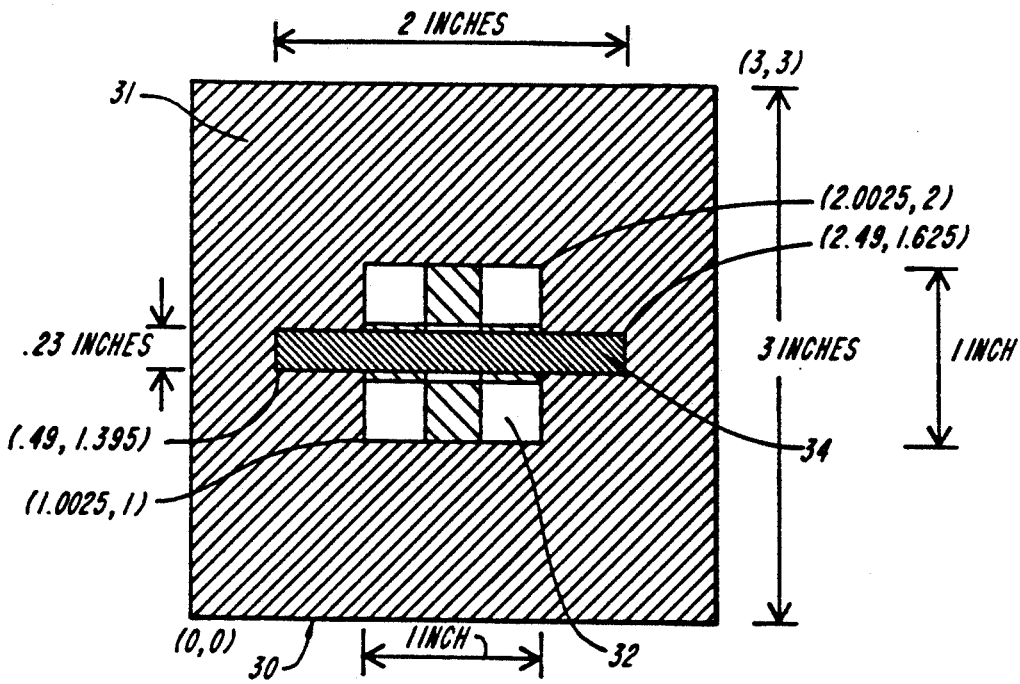

FIG. 3

```
72 72 SCALE % MAKE UNITS EXPRESSED IN INCHES
0 0 MOVETO % ORIGIN IS IN LOWER LEFT HAND CORNER
0 3 LINETO % UP 3 INCHES
3 3 LINETO % RIGHT 3 INCHES
3 0 LINETO % DOWN 3 INCHES
CLOSEPATH % MAKE 3 BY 3 INCH CLOSED RECTANGLE
.5 SETGRAY FILL % MAKE IT A MEDIUM GRAY COLOR AND FILL IT UP
GSAVE % REMEMBER WHERE WE ARE
1.0025 1 TRANSLATE % LOCATE LOWER LEFT CORNER OF RASTER AT 1.0025 INCH
       FROM LEFT HAND SIDE OF PAPER AND 1 INCH FROM BOTTOM OF PAPER.
/DATASTR 3 STRING DEF % STRING THAT WILL HOLD A ROW OF DATA FROM FILE
/DF (DATAFILE)(R) FILE DEF % OPEN DATAFILE AND NAME IT DF
3 3 8 % RASTER IS A 3 X 3 IMAGE WITH 8 BITS PER COLOR
[ 3 0 0 3 0 0 ] % MAP IMAGE DATE TO OUR 1 X 1 INCH RECTANGLE
(DF DATASTR READSTRING POP) % READ IN DATA
IMAGE % PAINT IMAGE
DF CLOSEFILE % CLOSE DATAFILE
GRESTORE % RETURN TO SAVED POSITION
0.8 SETGRAY % PAINT LINE LIGHT GRAY
.23 SETLINEWIDTH % MAKE LINE .23 INCHES WIDE
.49 1.51 MOVETO % START OF LINE IS AT .49 INCHES FROM LEFT, 1.51 INCHES
       FROM BOTTOM.
2 0 RLINETO % HORIZONTAL LINE 2 INCHES LONG
STROKE % PAINT LINE
SHOWPAGE % PRINT CURRENT PAGE
```

FIG. 4A

00 FF 00 FF 00 FF 00 FF 00
END-OF-FILE

<3600, 127><1200, EOL>
<1203, 127><1200, 255><1197 127><474, EOL>
< 588, 127><2400, 51>< 612, 127><276, EOL>
<1203, 127><1200, 255><1197, 127><450, EOL>
<3600, 127><1200, EOL>

<3600,1><1196,EOL>
<1196,1><404,255><400,0><404,255><1196,1><404,EOL>
<1196,1><404,0><400,255><404,0><1196,1><400,EOL>
<1196,1><404,255><400,0><404,255><1196,1><404,EOL>
<3600,1><1196,EOL>

| 0 | 255 | 0 |
|---|---|---|
| 255 | 0 | 255 |
| 0 | 255 | 0 |

| 0 | 0 | 0 | 0 | 255 | 255 | 255 | 255 | 0 | 0 | 0 | 0 |
|---|---|---|---|---|---|---|---|---|---|---|---|
| 0 | 0 | 0 | 0 | 255 | 255 | 255 | 255 | 0 | 0 | 0 | 0 |
| 0 | 0 | 0 | 0 | 255 | 255 | 255 | 255 | 0 | 0 | 0 | 0 |
| 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 |
| 255 | 255 | 255 | 255 | 0 | 0 | 0 | 0 | 255 | 255 | 255 | 255 |
| 255 | 255 | 255 | 255 | 0 | 0 | 0 | 0 | 255 | 255 | 255 | 255 |
| 255 | 255 | 255 | 255 | 0 | 0 | 0 | 0 | 255 | 255 | 255 | 255 |
| 0 | 0 | 0 | 0 | 255 | 255 | 255 | 255 | 0 | 0 | 0 | 0 |
| 0 | 0 | 0 | 0 | 255 | 255 | 255 | 255 | 0 | 0 | 0 | 0 |
| 0 | 0 | 0 | 0 | 255 | 255 | 255 | 255 | 0 | 0 | 0 | 0 |
| 0 | 0 | 0 | 0 | 255 | 255 | 255 | 255 | 0 | 0 | 0 | 0 |

*FIG. 12*

APPARATUS AND METHOD TO MERGE IMAGES RASTERIZED AT DIFFERENT RESOLUTIONS

BACKGROUND OF THE INVENTION

The present invention relates in general to a computer-based method for graphic reproduction, and in particular to a computer-based electronic page composition system.

Computers are frequently used to create print sets for layouts in magazines, brochures, and other printed material using color electronic pre-press systems. Images from a variety of sources including color scanners, digitizers, computer graphics, and text processing systems, can be integrated and viewed or modified on a video monitor. When the integrated page is finalized it is "rasterized," or encoded into a pixel-by-pixel format, and sent to an output device which records the image on film. Color images are usually produced using four color process half-tone screens. Therefore, one color page, made up of a variety of images, results in four half-tone screens, one for each of the four printing colors.

Pages of published material contain color images consisting of line art and continuous tone pictures, usually reproductions of photographs. Line art, including text and graphic objects, have different requirements for editing and reproduction than do continuous tone pictures. To reproduce line art without any blockiness or roughness in the edges, it is necessary to represent line art at a very high spatial resolution. Continuous tone pictures can be photomechanically reproduced at a relatively lower resolution, but require a large number of possible gray or color shades to be defined for every point in the reproduction. If the shades are not adequately defined, posterization, lack of smoothness, or other quantizing artifacts occurs.

Various methods have been developed to automate the production of color images. Scanners electro-optically scan color pictures and create half-tone color separations on high-contrast black and white photographic films at the correct sizes. Typesetters, using digitally encoded character data, create correctly sized and formed characters that are recorded on photographic film or paper.

Once the various image elements have been created and separately recorded on individual pieces of film, they must be combined into full page separations, or flats, before they can be printed. A full page separation is required for each color ink that will be used on the final printed page. The full page separations are created by stripping, or page assembly, a time-consuming manual process that involves cutting the various elements from their respective substrates and fastening them to carrier sheets, or flats, using adhesives. Each color separation of each element must be positioned on its respective flat in the correct position and in register with the other color separations. The required precision typically is to a small number of thousandths of an inch.

The full-page separations, one for each printing color, are used to make printing plates. The plates are mounted on a printing press and each is used to apply a different color ink to the paper, thus resulting in a full color print.

Some of these manual stripping operations have recently been automated. When image elements are represented in digital form in a computer, they can be electronically merged with other elements before being written on a single film using a phototypesetter, or an imagesetter. Scanned elements are represented in a computerized system as rasters, or matrices of pixels, and each pixel is represented by the intensity of each of its constituent colors, or by the amount of colorant to be applied.

Line art, such as text and graphic objects, is often represented using a vector format, with mathematical equations representing the boundaries of the lines and curves making up the image element, and various color codes describing the fill and border colors. With vector representation, text and graphic objects are resolution-independent until they are rasterized.

A raster image processor, or rasterizer, merges the scanned (raster) elements and the line art (text and graphic objects) elements on a page into a single composite raster image of the page containing all of the elements, each in its proper position. The resulting composite digital raster image is then recorded onto a sheet of photo-sensitive film using a phototypesetter, imagesetter, or other similar device.

Before rasterization, the vector data representing graphic objects and text is not usually stored in a computer using a raster or pixel-by-pixel format, but instead, because text and graphic objects are usually made up of geometric shapes of single colors and covering large areas relative to the size of a single pixel, they can be created and stored in a computer using mathematical descriptions rather than by individual definitions of each pixel. This allows text and graphic objects to be stored without using a large amount of memory.

Most film recorders are raster-oriented devices and record image data on film in a pixel-by-pixel and line-by-line sequence. Therefore, vector data that represents text and graphic objects cannot be recorded directly, but instead must first be "rasterized." Usually, a raster image processor transforms the mathematical descriptions of this line art into a raster format. The raster image processor (RIP) may be implemented either in software or hardware.

Unlike line art, raster images, such as digital representations of photographs, are stored in a computer pixel-by-pixel, each pixel having a defined color. The rasterizer takes this pixel-by-pixel data and produces new pixel-by-pixel data at the output resolution which may not be the same resolution as that of the original raster data. The rasterizer next merges all image elements and creates a representation of the page where the color of each pixel in the page is stored.

In the industry standard four color printing process four different color inks are printed. When printed, these primary colors appear to mix and give the appearance of many other colors. The last step of the rasterizer is to calculate the intensity of each primary color to use to give the correct color appearance of each pixel. The final result is four pages, or color separations, each representing the page in a different one of these primary colors.

In present systems, when raster images such as photographs are rasterized, they are scaled to the resolution of all of the other graphic objects so that they can be rasterized at the correct resolution. This change of resolution may be performed by the raster image processor, or by a preprocessor. Raster images, although stored at a lower resolution, require much more memory space than text or graphics require because they are represented in pixel-by-pixel format rather than by mathematical descriptions.

Line art, such as text or graphic objects, must normally be printed at a much higher resolution than is necessary for continuous tone images so that output images will have the desired sharpness, clarity and crisp line definition, and will not have jagged edges.

Using existing automated production methods, when raster images are combined with line art, the raster images must be rasterized at a high resolution, usually the resolution of the line art elements. Typically, a resolution from one million to over five million pixels per square inch is used. Because the raster images must be represented at this resolution, a great deal of computer memory is required. In addition, the processing time greatly increases when raster images are processed at the high resolution because such a large number of data elements must be processed.

Almost all high resolution film recorders are raster (line by line) oriented devices. Therefore, to produce high resolution film from artwork necessitates rasterizing the artwork when either color film recorders (2000, 4000 or 8000 pixels per line) or monochrome typeset film recorders (1000 to 5000 pixels per inch) are used. Producing film for photomechanical reproduction also involves separating and transforming colors into four or more inks, and requires a film to be produced for each color.

When photographic images are combined with text or graphics on a single page, three types of techniques are currently used to create a page layout that includes both types of images. The first is to create two or more separate sets of films where the text images are at a high resolution and the photographic images are at a lower resolution. The films are then physically cut and pasted (stripped) to integrate the two into a single image to be printed.

The second technique currently used involves assembling and screening an image page, including text, graphics and/or raster images, in software using one resolution for the entire image. If the page, and therefore the raster image, is rasterized at a high resolution, this technique requires much more processing time than would otherwise be necessary. For example, an 8 by 10 inch image would require 1 to 2 hours to process each of the four ink separations, resulting in a total processing time of 4 to 8 hours. In addition, much more memory space is used to store the photographic image at the higher resolution than is needed to store it at the lower resolution.

A third technique involves assembling the screened page in hardware using more than 100 Megabytes of data memory. This approach is expensive, and requires a large amount of special purpose hardware. These systems are generally used only for black and white images.

It is therefore an object of the present invention to provide a technique for merging images which have been rasterized at different resolutions.

It is a further object of the present invention to provide a technique for merging images without increasing the amount of storage needed to produce the integrated image.

It is also an object of the present invention to provide a technique for merging images without increasing the amount of time that is needed to produce the integrated image.

It is an additional object of the present invention to provide a technique for merging images using a system that requires decreased cost and complexity than present systems.

It is a further object of the present invention to provide a technique for merging images without physically cutting and pasting separate images.

SUMMARY OF THE INVENTION

In the present invention, a composite output image that contains low resolution image elements and high resolution image elements is produced. An input image containing text and graphic objects at a high resolution and raster images at a low resolution is rasterized twice. During the low resolution rasterization, only the low resolution graphic elements are rasterized. At places in the image where there are no low resolution elements, arbitrary data is substituted. This data is used as a place holder but will otherwise be ignored. During the high resolution rasterization, only the high resolution graphic elements of the input image are rasterized. Data for the background is included so that the background color will also be imaged. In places where there are low resolution image elements, a reserved intensity value is substituted.

The rasterized images are represented in compressed form using a run-code encoding technique that represents contiguous pixels along a single raster line having the same value as one pixel having that value and a repeat-pixel count. Contiguous identical lines are represented as one line and a repeat-line count.

The low resolution rasterization is scaled to the resolution of the output image by multiplying the repeat-pixel counts and the repeat-line counts by scaling factors. The reserved intensity value from the high resolution rasterization is used as a selector code to indicate that pixels from the low resolution rasterization should be used at the corresponding position. The two rasterizations are merged in hardware and combined with a screening tile. The merged output image is then sent to an output device.

BRIEF DESCRIPTION OF THE DRAWINGS

Other objects, features, and advantages of the invention will become apparent from the description of a particular embodiment, taken in combination with the drawings, in which:

FIG. 2 shows the four types of run-codes used during rasterization;

FIG. 3 is an image to be rasterized;

*PostScript is a trademark of Adobe Systems Incorporated.

Figures 4B, 5, 6:
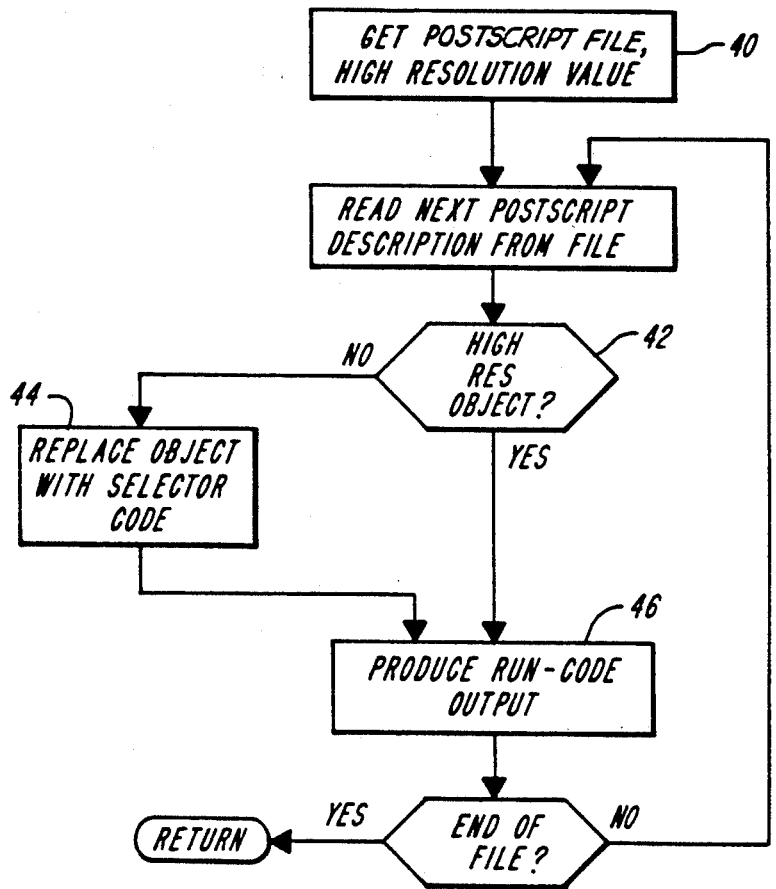
FIG. 4A is a PostScript TM * Language representation of the image of FIG. 3.

FIG. 4B is a file containing the contents of the file "data file" contained in the PostScript Language file shown in FIG. 4A.

Figure 7:
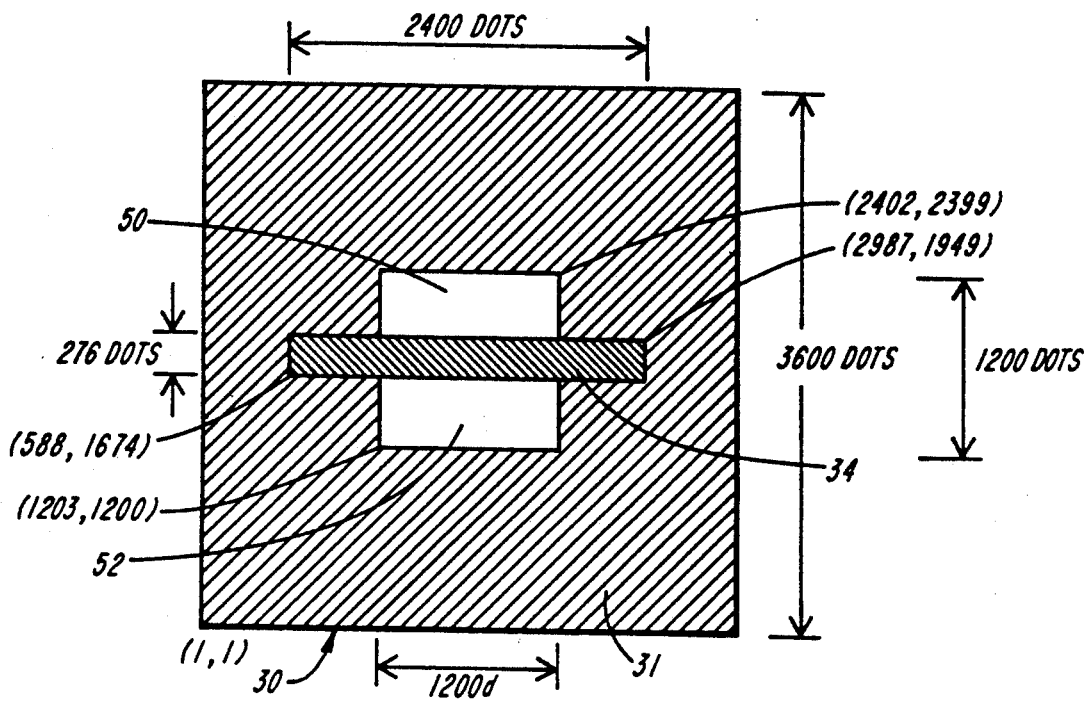
Figure 8:
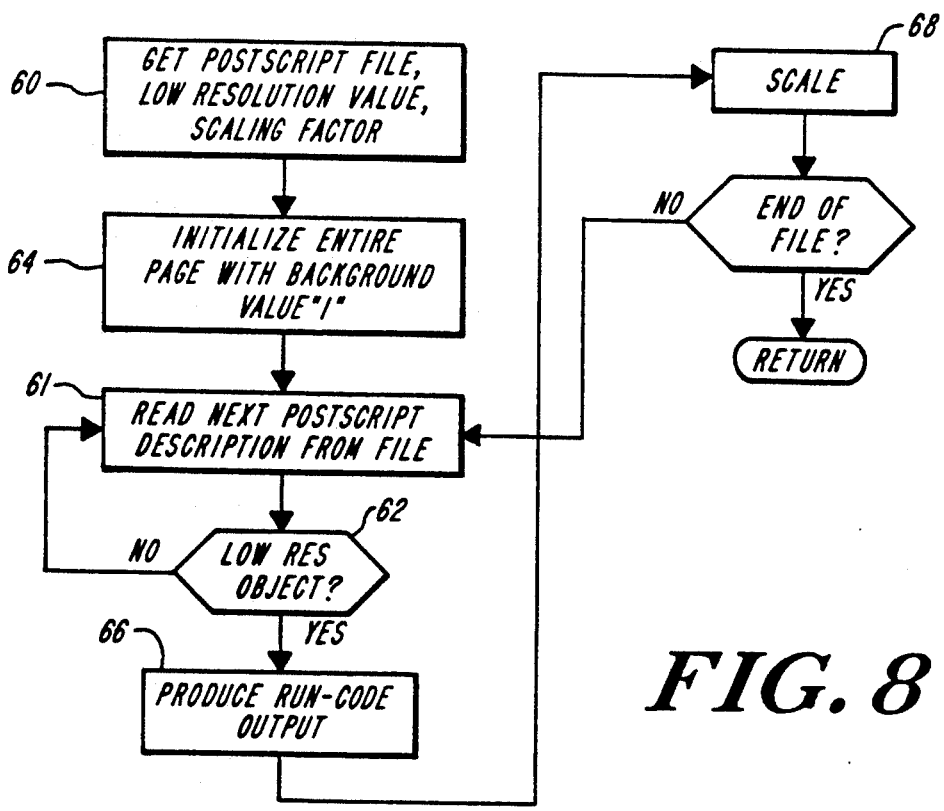
Figures 9, 10, 11:
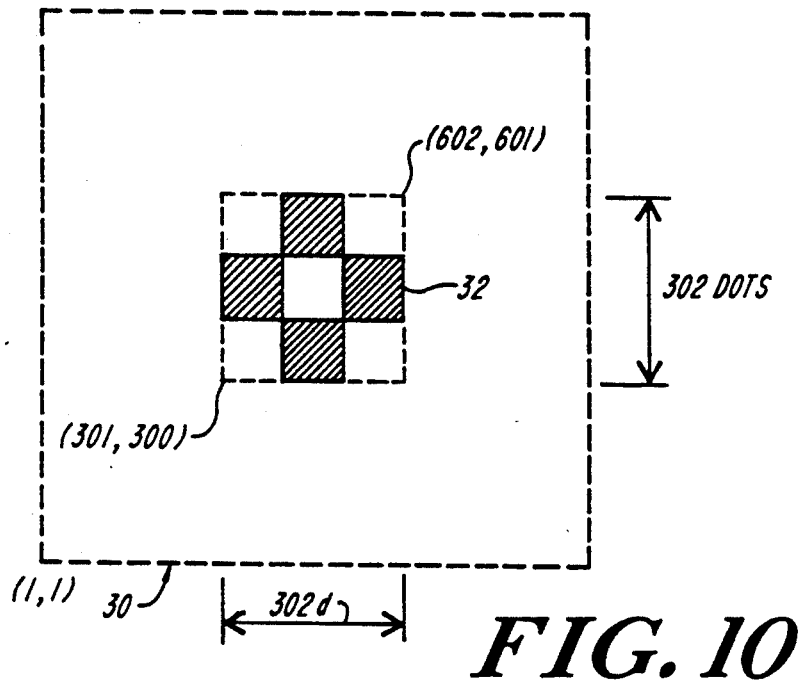
Figure 13:
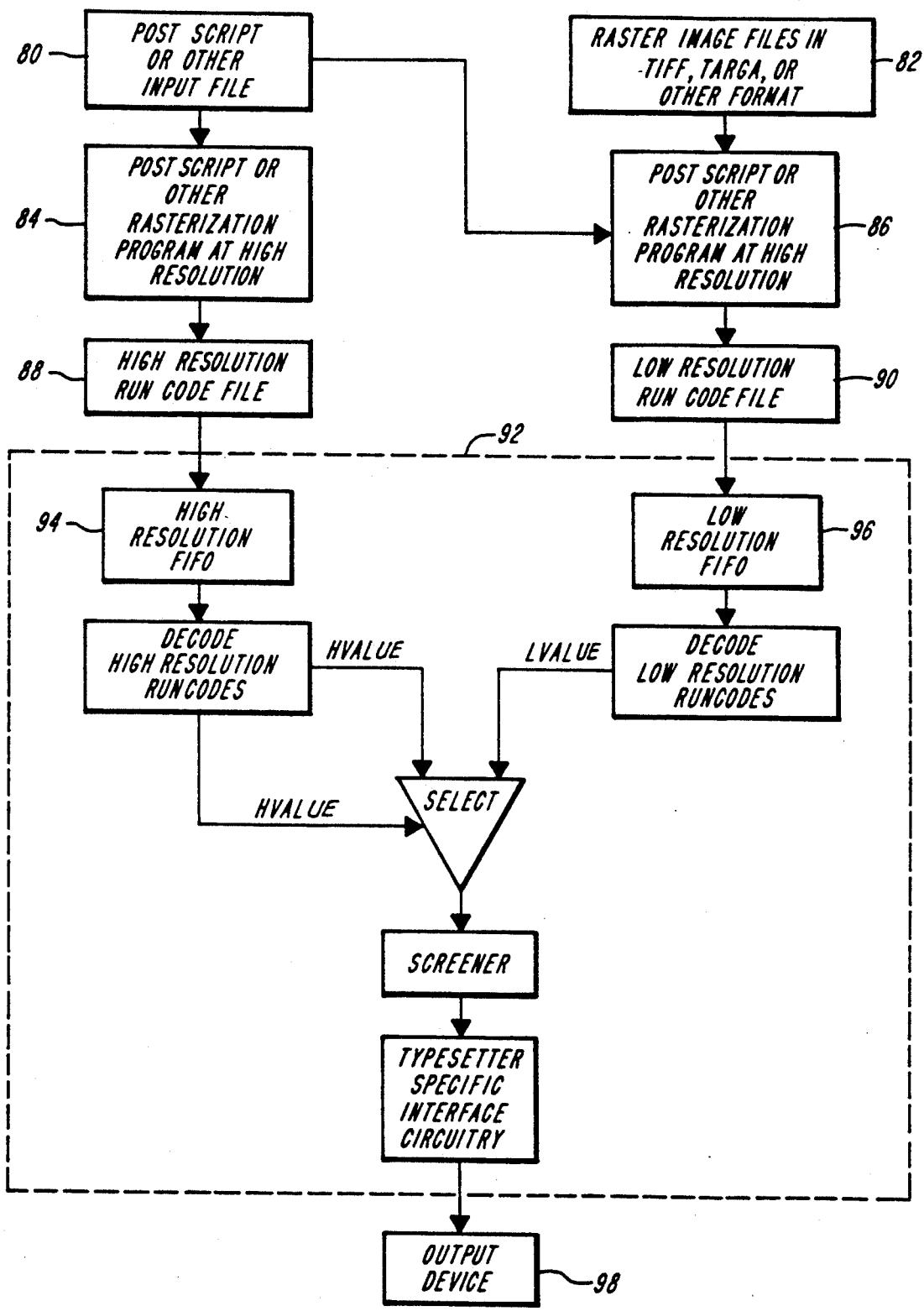
Figure 14:
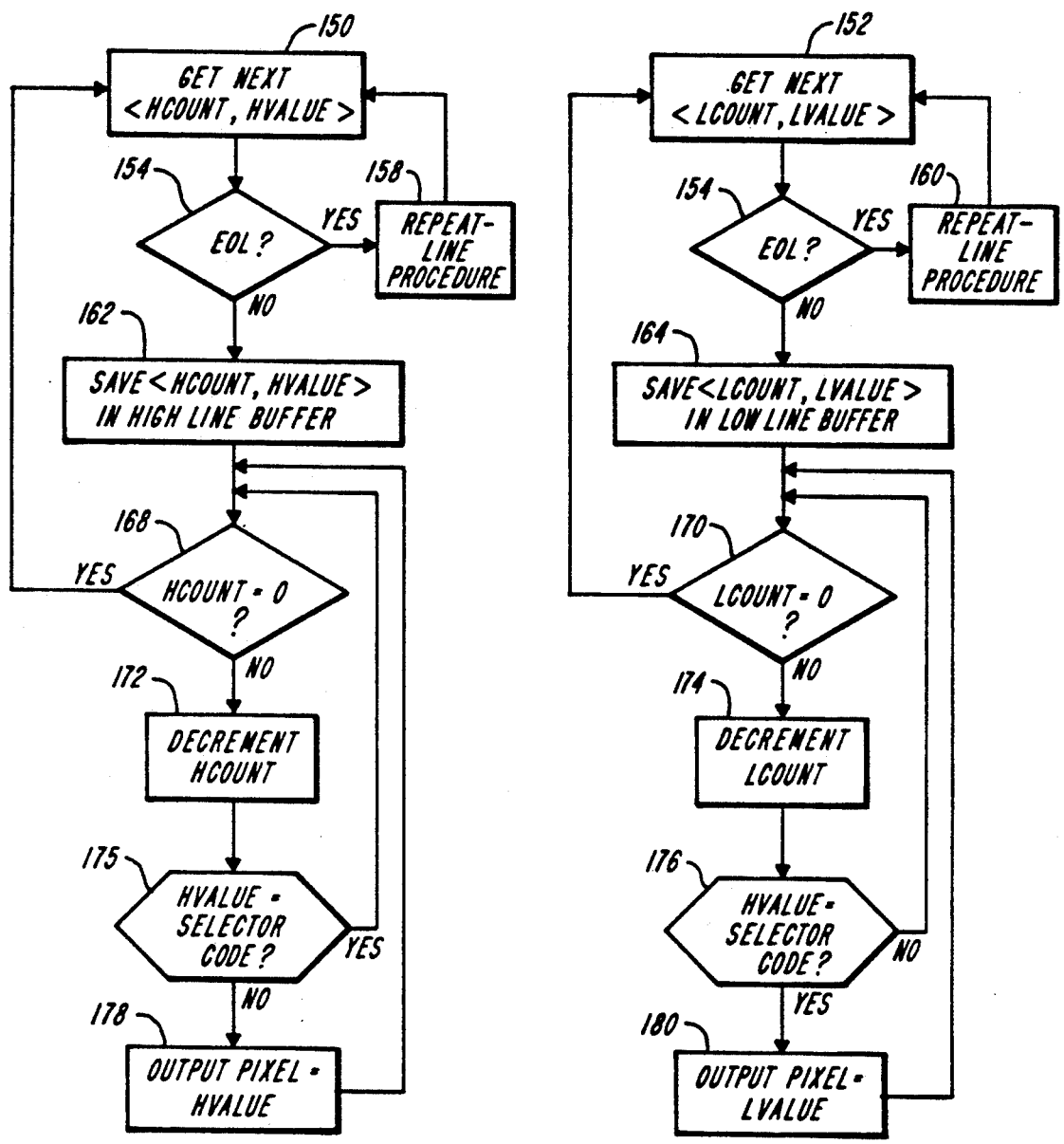
Figure 15:
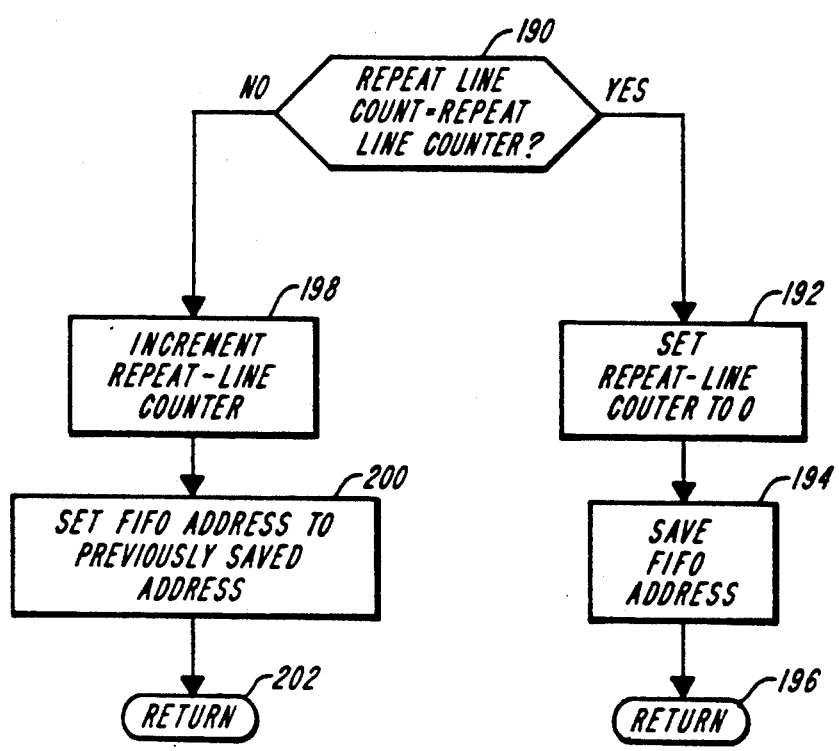
Figure 16:
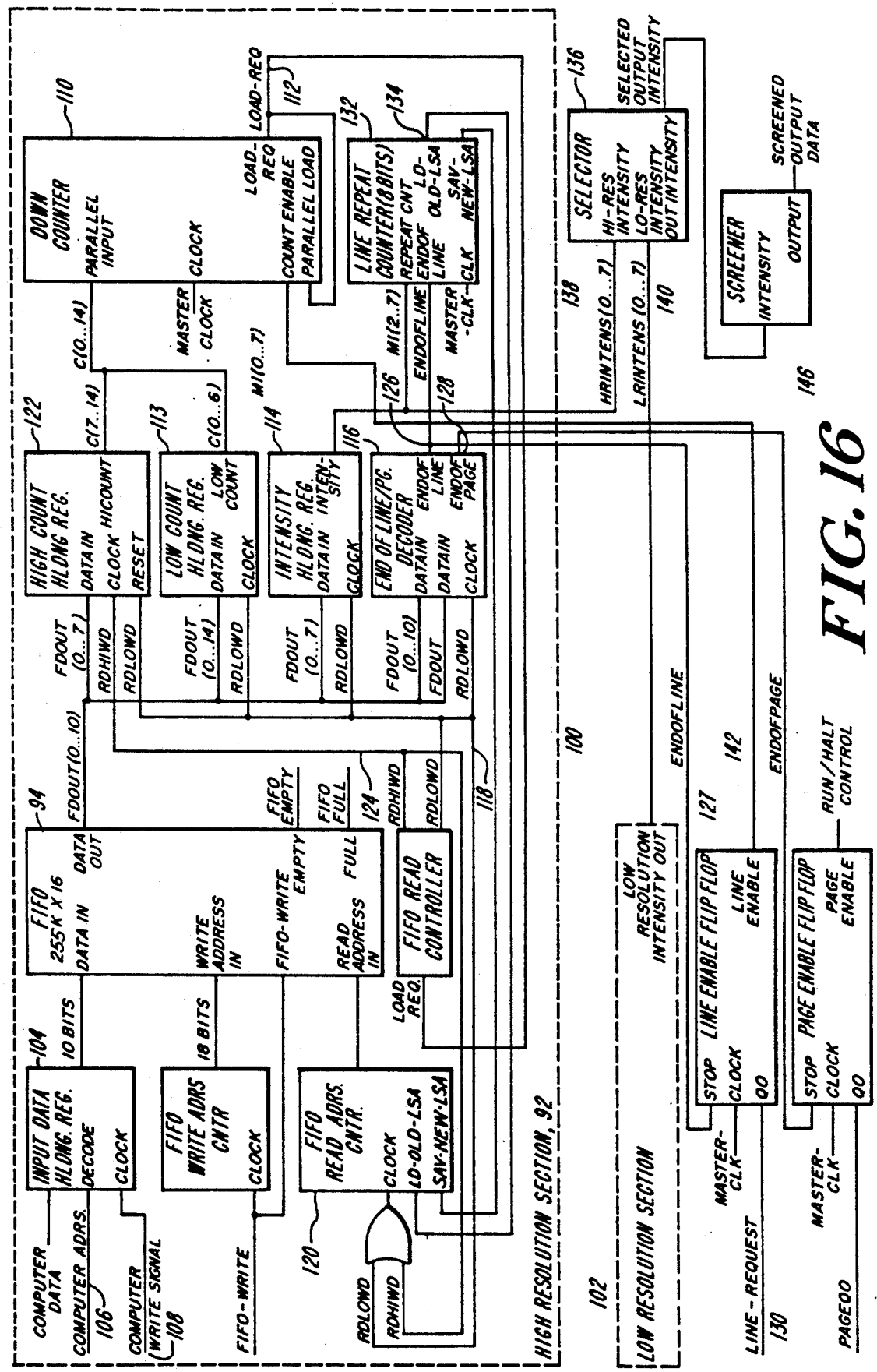

FIG. 5 is a flow chart of the process to rasterize the image at a high resolution;

FIG. 6 is the result of the high resolution rasterization of the image in a run-length encoded format;

FIG. 7 is a graphic representation of the high resolution rasterization shown in FIG. 6;

FIG. 8 is a flow chart of the process to rasterize the image at a low resolution;

FIG. 9 is the result of the low resolution rasterization of the image in a run-length encoded format;

FIG. 10 is a graphic representation of the low resolution rasterization shown in FIG. 9;

FIG. 11 shows nine pixels from a raster image at a low resolution;

FIG. 12 shows the nine pixels of FIG. 11 after scaling to the high resolution;

FIG. 13 is a block diagram of the image assembly system;

FIG. 14 is a flow chart of the merging process;

FIG. 15 is a flow chart showing the repeat-line procedure in greater detail; and FIG. 16 is a block diagram of the dual input screening engine.

DETAILED DESCRIPTION OF THE PREFERRED EMBODIMENT

Figure 1A:
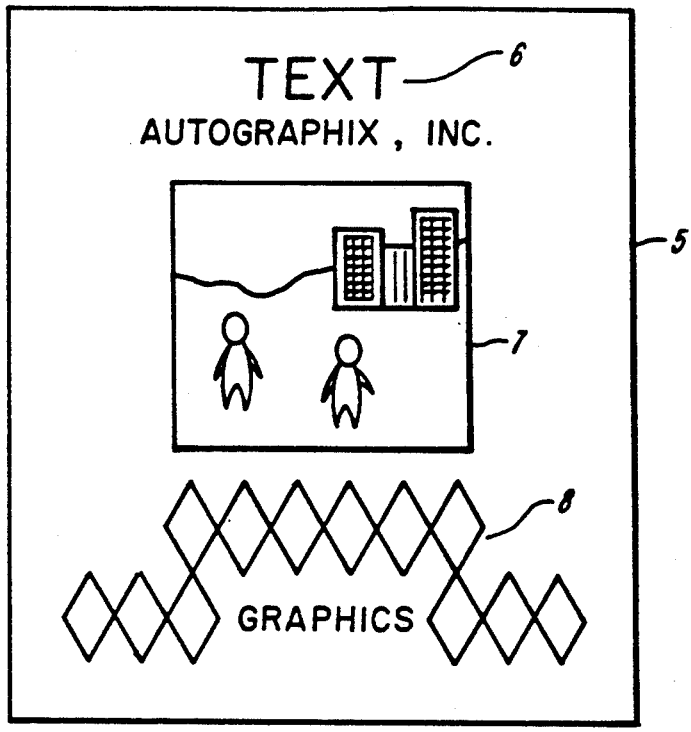
FIG. 1A is a input image having high resolution and low resolution image elements.

The present invention merges images that have been rasterized at different resolutions and creates a final composite image. Referring to FIG. 1A, an input image 5 is shown. The input image is formatted by the user using an interactive user interface. The page can be composed of any combination of text 6, computer-generated graphics 8, and scanned-in images 7.

High resolution input images, usually line art, such as text 6 and graphic objects 8, are stored and processed at a high resolution, while low resolution input images, usually continuous tone images 7 are stored and processed at a lower resolution. Both the high resolution and low resolution images are "rasterized", or converted to a pixel by pixel representation, and then sent to a dual input screening engine (DISE), which merges the two rasterizations. The DISE sends the integrated image, combined with a screening tile, to a film recorder.

Figure 1B:
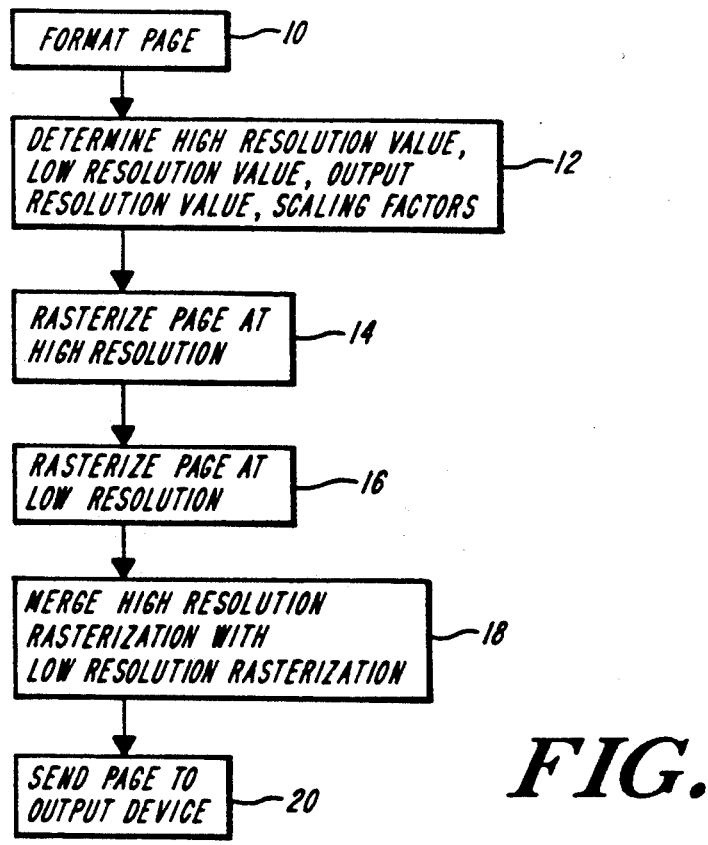
FIG. 1B is a flow chart of the page assembly system.

Referring to FIG. 1B, a flow chart of the present invention is shown. The input image page is formatted (shown at 10) by the user using an interactive user interface. The user specifies (at 12) the low and high resolutions, which will be the resolution of the continuous tone images and line art, respectively. In the preferred embodiment, the output resolution is the high resolution, although in alternate embodiments, the output resolution could be different from the high resolution. In addition, in alternate embodiments, the high and low resolutions could be the same.

The system determines (at 12) the scaling factors that will be needed to scale the low resolution image to the resolution of the output image. If necessary, the scaling factor needed to scale the high resolution image to the resolution of the output image is also determined.

The image is first rasterized at the high resolution (at 14), but only the high resolution elements are rasterized. Low resolution images are replaced with placeholder data. In the preferred embodiment, every pixel to be filled with low resolution rasterization data is replaced by a selector code. The rasterization transforms the line art elements on the page, which are initially stored as mathematical descriptions, into a pixel-by-pixel run-code format, which is stored in a file.

The image is then rasterized at the low resolution (at 16), rasterizing only the low resolution elements. Pixels containing no low resolution elements are filled with arbitrary data which will be ignored upon merging but serve as placeholders until merging. The continuous-tone images are also transformed into a pixel-by-pixel run-code file, and are scaled to the output resolution.

The two files are sent (at 18) to the dual input screening engine (DISE), which merges the two rasterizations. The DISE receives pixels in a run-code format from both files and selects one of the two pixels to be used to produce each pixel on the output page. The merged page is then sent (at 20) to an output device. In alternate embodiments, the merged page could be saved in a file.

The present invention rasterizes an entire image by performing separate rasterizations at different resolutions, and then merging the rasterizations. The image is rasterized using integral run-code rasterization. Integral run-code rasterization and merging is currently used in the industry, and is more efficient than pixel-by-pixel buffering, especially at higher resolutions.

In general, run-code rasterization takes an image and, from one end to the other of each line, represents pixels in a compact form. In the preferred embodiment of the present invention, groups of contiguous pixels on the same line and having the same intensity are represented by one pixel having that intensity and a repeat-pixel count. Identical contiguous lines are represented as one line and a repeat-line count. The preferred embodiment uses PostScript Language, a high level page description language. In the preferred embodiment, the PostScript Language Interpreter performs the rasterizations of the page.

In the preferred embodiment of the present invention, two different run-code formats are used to indicate the number of pixels in a group. A third run-code format is used to represent the number of times a line is to be repeated. These enhancements to standard run-code techniques allow image representation to be very efficient, and reduces the amount of time required to send an image to the screener. These enhancements are not required to affect the invention.

Referring to FIG. 2, the present invention uses four types of run-codes to represent the image. A two-byte run-code 22 is used for pixel groups having lengths of 1 to 127. The repeat-pixel count bits signify the number of times a pixel is to be repeated, while the intensity bits represent the color intensity of the pixel(s). A four-byte run-code 24 is used for pixel groups having lengths between 127 and 8,388,608. An end-line code 26 signifies the end of a line and the number of times the line is to be repeated. An end-page code 28 indicates the end of a page.

Referring to FIG. 3, a graphic representation of a page 30 to be rasterized is shown. A file contains a PostScript Language description of the page that represents two graphic objects: a raster image 32 at a low resolution (300 dpi); and a line 34 at a high resolution (1200 dpi). Both image elements are on a high resolution background 31.

Referring to FIG. 4A, a PostScript Language representation of the page of FIG. 3 is shown. This file is twice processed through a PostScript Language interpreter which translates the commands into definitions for each pixel on a 3 inch by 3 inch page. The description of the image shown in FIG. 4A is rasterized twice, once at a high resolution, and once at a low resolution. When the rasterizer encounters the file "datafile" in FIG. 4A, it will read the contents of file "datafile", shown in FIG. 4B. In the preferred embodiment, raster images can either be stored in the PostScript Language file, or in one or more separate files, as shown in FIG. 4B.

Referring to FIG. 5, a flow chart of the process to rasterize the page at the high resolution is shown. The system obtains (at 40) the PostScript Language file and the high resolution value. As the system encounters each object in the PostScript Language page file (such as the file shown in FIG. 4A), it determines (at 42) if the object is to be rasterized at a high resolution. If it is not, it replaces those pixels occupied by the object with the selector-code (at 44). The selector-code acts as a placeholder for the low resolution object. The system then produces run-code output (at 46). The process continues until the entire page has been rasterized.

During the high resolution rasterization, the low resolution raster images are replaced with placeholder-like objects having the same dimensions and positions on the page as the raster images. The pixels occupied by the objects are filled with a selector code which is used as an indicator to the DISE that the value for these locations should be obtained from the result of the low resolution rasterization. The rasterizer ensures that the selector code cannot occur in normal color specifications. In the preferred embodiment, the selector code has a value of 255, and all color values of the line art are scaled from the usual range of 0 to 255 to a range of 0 to 254. With this modification to the range of values, there is minimal visible impact on the result. In the preferred embodiment, the color-intensity values in the low resolution file can range from 0 to 255.

Although the preferred embodiment rasterizes the image page twice, using one selector code, in alternate embodiments the page could be rasterized three or more times, with additional selector codes for each additional rasterization.

Referring to FIG. 6, the file resulting from the high resolution rasterization is shown. The run-code representation describes the image using successive <count,value> codes. Count indicates the number of times to repeat the pixel, and value indicates the intensity value of the pixel(s). A special case is <count,eol>, which indicates both the end of the line and the number of times to repeat the line.

In FIG. 6, the first line of this file describes the large grey area at the bottom of the page shown in FIG. 3. The first run-code on line 1, <3600,127>, indicates 3600 pixels having the intensity value of 127. The second run-code on line 2, <1200,eol>, indicates that this line should be repeated 1200 times. Therefore, the first 1200 lines each contain 3600 pixels having the intensity value of 127.

The second run-code on line 2, having a value of <1200,255>, indicates that raster image data from the low resolution file is to be placed at this location during merging. The selector code of 255 indicates that the data in that area of the high resolution rasterization is to be replaced with the raster image when the two rasterizations are merged. Similarly, the second run-code on line 4 contains the selector-code, indicating that data from the low resolution rasterization file should be used for these pixels during merging.

A more elaborate page layout, such as that shown in FIG. 1A, would not only contain horizontal lines, but also diagonal lines and text. This would result in many end-of-line codes with a repeat-line count of 1 because successive lines would likely be different from each other. Although the resulting listing would be much longer than that shown in FIG. 6, it would still be a relatively small file to store on a computer.

FIG. 7 shows a graphic representation of the result of rasterizing the file at the high resolution, although this image is not actually produced by the preferred embodiment. In FIG. 7, the image has been rasterized at 1200 dpi. The high resolution rasterization file contains two empty blocks, 50 and 52, which will later be replaced by the raster image. Both the background 31 of the page 30 and the line 34 were rasterized at the high resolution. The high resolution rasterization proceeds quickly because the raster images are not being rasterized at the high resolution. In the preferred embodiment, all image elements except raster images are rasterized at the high resolution.

Referring to FIG. 8, the process to rasterize the page at the low resolution is shown. Initially, the process obtains (at 60), the PostScript Language file of the page, the low resolution value, and the appropriate scaling factors.

The preferred embodiment allows a raster image to be scanned into the system at one resolution and yet processed at a different resolution (the "low resolution"). The preferred embodiment uses a bi-linear interpolation process to "translate" the raster image at the input resolution to the low resolution that will be used in processing the image. This interpolation process prevents artifacts that could occur when the input resolution is not an integer multiple of the low resolution, or vice versa.

Referring again to FIG. 8, the page is intitialized (at 64), resulting in the entire page having a background value of "1". The system then reads the PostScript Language description from the input file (at 61) and determines (at 62) whether the object is a low resolution or high resolution object. In the preferred embodiment, high resolution objects are indicated by prepending PostScript Language code to the description file. This code is based on a common PostScript Language mechanism that allows operators representing unwanted objects to be redefined as commands having no rendering effect. When the low rasterization process encounters high resolution objects, it skips them so that, in their place remain the initialized value "1".

The system (at 66) produces a run-code rasterization of the file. All high resolution portions of the page are represented using the initialized background value ("1" in the preferred embodiment), and all low resolution portions contain the actual data values, pixel-by-pixel. The background values serve as a placeholder for the high resolution images. Upon merging, the background values will be discarded, and the high resolution pixels will be selected as data for the output image.

FIG. 9 shows the file resulting from the rasterization of the page file of FIG. 4 at a low resolution, 300 dpi, and after scaling to match the high resolution. This rasterization contains only the raster image. The background contains the value "1", but in alternate embodiments, any value could be used because this value will never be selected by the merger as indicated by the high resolution file.

FIG. 10 shows a graphic representation of the result of rasterizing the file at a low resolution, although this image is not actually produced by the preferred embodiment. In FIG. 10, the image has been rasterized at 300 dpi. The low resolution rasterization file contains the raster image 32.

Rasterizing the entire page at a high resolution, and indicating where raster images should be placed allows text and graphics to be processed at an optimum resolution. It also provides for a precise and accurate definition of the borders of all raster images.

The placement of all objects, including the low resolution objects, are fully specified at high resolution. However, the actual data for the low resolution elements are contained only in the low resolution raster files.

Referring again to FIG. 8, after each run-code <count,value> set is produced, it is scaled (68). In this example, the low resolution is 300 and the high resolution is 1200. Therefore, both the horizontal and vertical scaling factors are 4. Because the preferred embodiment represents images in a compressed form using a run-code encoding technique, scaling is easily accomplished. The low resolution rasterization is scaled in the horizontal direction by multiplying the repeat-pixel count by the horizontal scaling factor. It is scaled in the vertical direction by multiplying the repeat-line count by the vertical scaling factor. The vertical scaling and horizontal scaling factors do not need to be the same value, nor must they be integers if the remainders are accumulated.

The result of the low resolution rasterization is scaled up to match the output resolution. The scaling factors brings the effective resolution of the data in the low resolution files to the resolution of the high resolution file, although the information content remains at the low resolution. In alternate embodiments, the high resolution may also be scaled up to the output resolution.

FIG. 11 shows nine pixels from a raster image at a low resolution. The pixels are represented at the low resolution by the following run-code:

| <1,0>   | <1,255> | <1,0>   | <1,eol> |
| <1,255> | <1,0>   | <1,255> | <1,eol> |
| <1,0>   | <1,255> | <1,0>   | <1,eol> |

FIG. 12 shows the nine pixels of FIG. 11 after scaling by a scaling factor of 4. The pixels are represented at the high resolution by the following run-code:

| <4,0>   | <4,255> | <4,0>   | <4,eol> |
| <4,255> | <4,0>   | <4,255> | <4,eol> |
| <4,0>   | <4,255> | <4,0>   | <4,eol> |

After scaling, the low resolution rasterization is actually at the high resolution. However, the information content in the high resolution rasterization file is at the low resolution. Only the run-code lengths have been scaled so that the data are now represented at the high resolution. Therefore, the memory requirements to store the file at the high resolution are nearly the same as that required to store the file at the low resolution.

Because a typical page contains text, complex graphic objects, and raster images, there are great savings in storage space in the high resolution file when the information contents of the raster images are not rasterized at the high resolution. The storage requirements to store the files shown in FIG. 11 and FIG. 12 are identical. Although the second file is at the high resolution, the information content in the run-code file is at the low resolution.

Another advantage of this process is that the low resolution file does not change when the high resolution elements are rasterized.

The scaling factors may be either an integer or a non-integer value. When the scaling factors are not integers, the rasterization process compensates by summing fractional parts in subsequent run-codes until an entire pixel (in the case of horizontal scaling) or line (in the case of vertical scaling) is accumulated. For example, if the high resolution were 2475 and the low resolution were 300, the scaling factor would be 8.25. To scale the low resolution file in a vertical direction by a factor of 8.25, the first three out of every set of four contiguous lines is repeated 8 times, and the fourth line of every set is repeated 9 times. Similarly, to scale the low resolution file in a horizontal direction, pixels are repeated in a horizontal direction, and any fractional parts of pixels are summed until an entire pixel is accumulated.

The result of the scaling may produce an unwanted border around the low resolution image. This occurs during scaling of the low resolution element when fractional parts of pixels are summed. Rounding of the accumulated sum may cause the border of the low resolution element to be plus or minus one pixel from being adjacent to a high resolution element instead of being exactly adjacent to the high resolution element. Referring again to FIG. 3, the raster image has its left border at 1.0025 inches, which is exactly 1203 pixels at 1200 dpi, (as shown in FIG. 7) and 300.75 pixels at 300 dpi, which the rasterizer will round to 301 pixels. Therefore, the high resolution file has the first raster at location 1203, while the low resolution file only has raster information from location 1204 (301 pixels multiplied by a scaling factor of 4). This would cause an unwanted contrasting border around some of the raster images in the combined high resolution rasterization.

In the preferred embodiment, the unwanted borders are eliminated by enlarging all raster images in the low resolution rasterization by one pixel in each direction. The PostScript Language permits the image operator to be redefined to achieve this effect.

Referring to FIG. 13, a block diagram of the system is shown. The PostScript Language input file 80 contains high resolution line art, and may contain low resolution images. One or more files 82 contain low resolution raster images. The PostScript Language file 80 is rasterized first at a high resolution (shown at 84), and then at a low resolution (shown at 86).

In the preferred embodiment, raster images may be stored in one or more separate files, with the PostScript Language file containing pointers to the raster image files. The low resolution rasterization will read the separate raster image files 82 when indicated by the PostScript Language file (shown at 86).

Both resulting files 88 and 90 are stored in run-code format using the repeat-pixel counts and repeat-line counts to store the data efficiently. The low resolution file 90 is scaled to the output resolution as it is rasterized by multiplying the repeat-pixel and repeat-line counts in the low resolution file by their respective scaling factors.

The high resolution run-code file and the low-resolution run-code file are sent to the DISE 92 where they are merged, screened and then sent to an output device 98. The high resolution file is used as the master file from which data is selected unless the selector code is found, in which case data is selected from the low resolution file.

The high resolution and low resolution run-code files are sent, buffer-by-buffer, to two FIFO (First In First Out) buffers 94, 96 in the DISE. One of the data streams received at the DISE represents the high resolution rasterization of the page. The other data stream represents the low resolution rasterization of the page.

The DISE 92 reads data from both FIFO's and expands the run-code data to pixel-by-pixel data. Pixels are read from the high resolution buffer and compared to the selector code. When a pixel in the high resolution buffer has the value of 255, it is discarded and replaced by the value of the corresponding pixel from the low resolution buffer. Because data is expanded from run-codes as it is used, memory requirements for the merging process are greatly reduced.

Referring to FIG. 14, a flow chart of the merging process is shown. The high resolution portions and the low resolution portions of the process run independently of each other, but are synchronized by virtue of counting output pixels along a line simultaneously. Therefore corresponding pixels from both data streams are available for selection. Initially, both portions obtain the appropriate <count,value> pair. The high resolution portion reads from the high resolution FIFO buffer (shown at 150), while the low resolution portion reads from the low resolution FIFO buffer (shown at 152). If the value read indicates an end-of-line, the repeat-line procedure is followed, otherwise, the <count,value> pair is saved. The high resolution <count,value> pair is saved in the high resolution line buffer (162), and the low resolution <count,value> pair is saved in the low resolution line buffer (164).

If the count value is 0 (tested at 168 and 170), indicating that the pixel has been repeated the appropriate number of times, the process returns to obtain another <count,value> pair. Otherwise, the count value is decremented (shown at 172 and 174). The high resolution value is then tested (at 175 and 176) to determine if the high resolution value is the selector code. If the high resolution value is the selector code, the low resolution value is sent to be output (180). Otherwise, the high resolution value becomes the output pixel (178). The tests at 168 and 170 are then repeated and the process continues.

This process continues creating output pixels until an end-of-line code in the <count,value> pair is encountered. At this point, the process will then, if the count value in the end-of-line <count,value> pair so indicates, repeat the line.

The repeat-line process is shown in FIG. 15. The process is identical for both high and low resolution processing, therefore only one process is shown.

When imaging the page begins, the repeat-line counter, which counts how many times a line has been repeated, is initially set to zero. The FIFO address, which points to the location in the FIFO from which to take the next run-code, is also set to zero.

When an end-of-line code is encountered, its repeat count is compared to the count in the repeat-line counter (at 190). If they are equal, the line does not need to be repeated (they will both be zero), or the line has already been repeated the desired number of times. In this case the repeat-line counter is set to zero (at 192) and the FIFO address, which will be pointing to the first run-code of the next line, is saved (at 194). The repeat-line logic will then return control to the logic that processes a line (at 196).

If the repeat-count does not equal the count in the repeat-line counter (at 190), the repeat-line counter is incremented (at 198), and the FIFO address is set to the previously saved FIFO address (at 200) which points to the start of the line to be repeated. Control is then returned to the logic that processes a line (at 202).

The merging process thus obtains the run-code data from the FIFO buffers and expands the data to pixel-by-pixel data. Pixels are repeated by counting down the repeat-pixel count, and lines are repeated by jumping back in the FIFO to the start of the line just processed.

In the preferred embodiment, the merging process is performed in the DISE 92, which is electronic circuitry, although the same functions could be performed using software.

Referring to FIG. 16, a block diagram of the Dual Input Screening Engine (DISE) 92 is shown. The block diagram shows a detailed drawing of the high resolution section 100 of the DISE 92, and an outline of the low resolution section 102. The low resolution section is identical to the high resolution section.

Referring to the high resolution section 100 shown in FIG. 16, the computer writes run-code data to the INPUT DATA HOLDING REGISTER 104 which passes the data to the FIFO 94. Data is removed from the FIFO when the DISE reads data from it. The computer continually checks whether the FIFO is full, and if it is not, more data is sent to the INPUT DATA HOLDING REGISTER 104.

The INPUT DATA HOLDING REGISTER 104 decodes the ADDRESS 106 and WRITE 108 lines and stores the word addressed to it. At the proper time, synchronous to the DISE MASTER-CLOCK, data is taken from the INPUT DATA HOLDING REGISTER and written into the FIFO by the FIFO-WRITE signal. This signal also increments the FIFO-WRITE ADDRESS COUNTER.

The repeat-pixel codes encoded in the run-codes are counted down by the DOWN COUNTER 110. When this counter reaches a count of 1, the LOAD-REQ 112 signal is generated and a new word is taken out of the FIFO 94. The bits of this word are loaded into LOW COUNT HOLDING REGISTER 113, the INTENSITY HOLDING REGISTER 114 and the END OF LINE/PAGE DECODER 116. The signal that loads these is RDLOWD 118. RDLOWD also increments the FIFO READ ADDRESS COUNTER 120 which will then point to the next FIFO 94 word to be read, and resets the HIGH COUNT HOLDING REGISTER 122 to zero.

If the run-code is a two-byte run-code, the HIGH COUNT HOLDING REGISTER 122 and the LOW COUNT HOLDING REGISTER 113 will contain the repeat-pixel count and the INTENSITY HOLDING REGISTER 114 will contain the intensity. If the run-code is an END LINE CODE or an END PAGE CODE, these codes will have been stored in and will be decoded by the END OF LINE/PAGE DECODER 116.

If the run-code is a four-byte run-code, an additional two-byte word will be taken from the FIFO and loaded into the HIGH COUNT HOLDING REGISTER 122 by the signal RDHIWD 124. RDHIWD 124 will also increment the FIFO READ ADDRESS COUNTER 120.

The holding registers are loaded when the DOWN COUNTER 110 counts down to a count of one, indicating the end of a line or the end of a page. FIFO reading and register loading will take place between the MASTER-CLOCK pulse that causes the down-counter to go to a count of one and the next MASTER-CLOCK pulse.

If it is not the end of a line or the end of a page, the next MASTER-CLOCK pulse and the LOAD-REQUEST 112 signal from the DOWN-COUNTER 110 will cause the DOWN-COUNTER 110 to be parallel loaded with the next repeat-pixel length. The process of counting down the repeat-pixel length will then begin.

When the DOWN-COUNTER 110 counts down to a count of one, a new code is read from the FIFO and loaded into the LOW-COUNT HOLDING REGISTER 113, INTENSITY HOLDING REGISTER 114, and END OF LINE/PAGE DECODER 116. If the END OF LINE/PAGE DECODER 116 decodes an END-OF-LINE code, the ENDOFLINE 126 signal will be generated.

The ENDOFLINE 126 signal resets the LINE ENABLE FLIP FLOP 127 which causes the DOWN COUNTER 110 to cease counting and to cease generating the LOAD-REQUEST 112 signal. This temporarily stops the operation of the DISE 92. Operation of the DISE will only commence when the LINE ENABLE FLIP FLOP 127 is set by a new LINE-REQUEST 130 input which represents a request for another line to be processed.

The ENDOFLINE 126 signal also goes to the LINE REPEAT COUNTER 132 where it is compared with the intensity bits (INTENS7-INTENS2), which contain the repeat-line number. If the repeat-line number is not equal to the count in the LINE REPEAT COUNTER 132, the LINE REPEAT COUNTER 132 will increment and the LOAD OLD LINE START ADDRESS (LD-OLD-LSA) 134 signal will be generated. LD-OLD-LSA 134 will cause the FIFO READ ADDRESS COUNTER 120 to be set to the address of the first run-code in the line to be repeated. When the next line is processed, it will then be a repeat of the previous line.

If the repeat-line number is equal to the count in the LINE REPEAT COUNTER 132, the previous line has been repeated the required number of times. The LINE REPEAT COUNTER 132 is then reset to zero and the address in the FIFO READ ADDRESS COUNTER 120, which points to the first run-code of the new line, will be saved. The saved address is used to repeat this new line, if necessary.

The SELECTOR 136 selects intensity data from either the high resolution 100 or the low resolution half 102 of the DISE. The intensity value of 255 in the HIGH RESOLUTION INTENSITY data stream 138 is reserved to indicate that the LOW RESOLUTION INTENSITY 140 byte should be used. Any other value of the HIGH RESOLUTION INTENSITY 138 indicates that the HIGH RESOLUTION INTENSITY 138 byte should be used.

In the preferred embodiment, the high resolution section 100 and the low resolution section 102 run synchronously so that the high resolution and the low resolution intensity bytes are obtained at the same time and compared to select which should be used for the output intensity. The LINE ENABLE FLIP FLOP 127 and the high and low resolution sections 100, 102 run synchronous to the MASTER-CLOCK. When the LINE-REQUEST 112 signal comes into the DISE (from a laser printer), it causes the LINE ENABLE FLIP FLOP 127 to be generated synchronous to the MASTER CLOCK. The LINE ENABLE signal 142 will then start the process of loading run-codes from both the high and low resolution sections 100, 102, and will begin the process of counting down both sections synchronous to the MASTER-CLOCK.

Although the high resolution FIFO 94 and the low resolution FIFO 96 contain different image data, the run-codes in each represent the same number of output pixels per line. Each will therefore come to an END LINE CODE and stop counting at the same time even though they each contain different numbers and lengths of run-codes. Both sections 100, 102 will then be ready for a new LINE-REQUEST.

The merged data 144 is combined with a screening tile 146 in the screener and sent to a film recorder. The DISE operates at the rate of the film recorder, which always runs at a continuous speed. This prevents large anomalies which are produced when the recorder is started and stopped during processing.

While the foregoing invention has been described with reference to a preferred embodiment, it should be understood that various modifications and alterations will occur to those skilled in the art. Such modifications and alterations are intended to fall within the scope of the appended claims.

We claim:

1. A method of producing an output image from an input image, said input image being comprised of low resolution input image elements and high resolution input image elements, said method including the steps of:
    rasterizing said input image at a high resolution to produce a high resolution rasterization of the entire said input image wherein said high resolution input image elements are represented at said high resolution;
    rasterizing said input image at a low resolution to produce a low resolution rasterization of said entire input image wherein said low resolution input image elements are represented at said low resolution;
    selecting certain of said high resolution image elements from said high resolution rasterization;
    selecting certain of said low resolution image elements from said low resolution rasterization; and
    sending said selected high resolution image elements and said selected low resolution image elements to an output device to produce said output image at an output resolution.

2. The method of claim 1 wherein said high resolution rasterization includes a first set of placeholder data representative of the portions of said input image comprising said low resolution input image elements.

3. The method of claim 2 wherein said low resolution rasterization includes a second set of placeholder data representative of the portions of said input image comprising said high resolution input image elements.

4. The method of claim 1, said method further including scaling said low resolution rasterization to either said high resolution or said output resolution.

5. The method of claim 4 including scaling said low resolution rasterization to the resolution of said output image.

6. The method of claim 1 including scaling said high resolution rasterization to the resolution of said output image.

7. The method of claim 1 wherein the resolutions of said high resolution rasterization and said low resolution rasterization are equal.

8. The method of claim 1 wherein at least one of said rasterizations includes representations of input image elements in compressed form.

9. The method of claim 1 further comprising the step of:
scaling said low resolution rasterization in a first direction by a scaling factor SX wherein said scaling factor SX is equal to the resolution of said output image in said first direction divided by the resolution of said low resolution rasterization in said first direction.

10. The method of claim 9 further comprising the step of:
scaling said low resolution rasterization in a second direction by a scaling factor SY wherein said scaling factor SY is equal to the resolution of said output image in said second direction divided by the resolution of said low resolution rasterization in said second direction.

11. The method of claim 10 wherein SX is not equal to SY.

12. The method of claim 10 wherein one of said scaling factors is a non-integer number.

13. A method of producing an output image at an output resolution from an input image, said input image being comprised of low resolution input image elements and high resolution input image elements, said method including the steps of:
rasterizing said input image at a high resolution to produce a high resolution rasterization of the entire input image wherein said input image is represented as a plurality of data elements at said high resolution;
rasterizing said input image at a low resolution to produce a low resolution rasterization of said entire input image wherein said input image is represented as a plurality of data elements at said low resolution;
scaling said low resolution rasterization to the resolution of said output image;
merging said high resolution rasterization and said low resolution rasterization to produce said output image by combining certain of said high resolution data elements with certain of said low resolution data elements, said output image including said certain high resolution data elements and said certain low resolution data elements.

14. The method of claim 13 wherein said high resolution rasterization includes:
high resolution image elements comprised of a plurality of data elements representative of the portions of said input image comprising said high resolution input image elements; and
a first set of placeholder data elements representative of the portions of said input image comprising said low resolution input image elements.

15. The method of claim 14 wherein each of said data elements in said first set is a selector code, wherein said selector code indicates whether a data element is an element of data in said output image.

16. The method of claim 15 wherein said low resolution rasterization includes:
low resolution image elements comprised of a plurality of data elements representative of the portions of said input image comprising said low resolution input image elements; and
a second set of placeholder data elements representative of the portions of said input image comprising said high resolution input image elements.

17. The method of claim 16 wherein each of said data elements in said second set is an arbitrary value.

18. The method of claim 16, wherein said merging step further comprises the steps of:
(a) obtaining one high resolution data element from said high resolution rasterization;
(b) obtaining one low resolution data element from said low resolution rasterization;
(c) sending said one high resolution data element to said output device to produce said output image if said one high resolution data element is not said selector code;
(d) sending said one low resolution data element to said output device to produce said output image if said one high resolution data element is said detector code; and
repeating steps (a) through (d) until all of said data elements in said high resolution rasterization and said low resolution rasterization have been obtained.

19. The method of claim 13 wherein said merging includes:
providing data elements corresponding to particular portions of said output image from said high resolution rasterization simultaneously with providing data elements corresponding to respective ones of said portions from said low resolution rasterization;
selecting only one of each pair of said simultaneously presented data elements; and
sending the selected one of said elements to an output device to provide portions of said output image.

20. The method of claim 19 wherein contiguous data elements having the same characteristics are represented as a single data element having those characteristics and a repeat data element code.

21. The method of claim 20, further including the steps, prior to said merging, of:
determining a scaling factor to scale said low resolution rasterization to the resolution of said output image; and
scaling said repeat data element code in said low resolution rasterization by said scaling factor.

22. The method of claim 13, said scaling comprising:
scaling said low resolution rasterization in a first direction by a scaling factor SX wherein said scaling factor SX is equal to the resolution of said output image in said first direction divided by said low resolution in said first direction; and
scaling said low resolution rasterization in a second direction by a scaling factor SY wherein said scaling factor SY is equal to the resolution of said output image in said second direction divided by said low resolution in said second direction.

23. The method of claim 22 wherein one selected data element of said low resolution image produces on average SX.SY data elements in said output image.

24. The method of claim 23 wherein said data elements are pixels and contiguous pixels on a line having the same characteristics are represented as a single pixel having those characteristics and a repeat pixel code.

25. The method of claim 24 wherein said data elements are lines and contiguous lines having the same characteristics are represented as a single line having those characteristics and a repeat line code.

26. The method of claim 25, said scaling further including:

scaling said repeat pixel code in said low resolution rasterization by said scaling factor SX; and scaling said repeat line code in said low resolution rasterization by said scaling factor SY.

27. The method of claim 26 wherein said first direction is the horizontal direction and said second direction is the vertical direction.

28. A method of producing an output image from an input image, said input image being comprised of low resolution input image elements and high resolution input image elements, said method including the steps of:

rasterizing said input image at a high resolution to produce a high resolution rasterization of the entire input image wherein said input image is represented as a plurality of pixels at said high resolution;

rasterizing said input image at a low resolution to produce a low resolution rasterization of said entire input image wherein:

said input image is represented as a plurality of pixels at said low resolution wherein:

contiguous pixels on a line having the same characteristics are represented as a single pixel having those characteristics and a repeat pixel code, and contiguous lines having the same characteristics are represented as a single line having those characteristics and a repeat line code;

scaling said repeat pixel code in said low resolution rasterization by a scaling factor SX wherein said scaling factor SX is equal to the resolution of said output image in a horizontal direction divided by said low resolution in said horizontal direction;

scaling said repeat line code in said low resolution rasterization by a scaling factor SY wherein said scaling factor SY is equal to the resolution of said output image in a vertical direction divided by said low resolution in said vertical direction;

merging said high resolution rasterization and said low resolution rasterization by:

(a) obtaining one pixel from said high resolution rasterization;

(b) obtaining one pixel from said low resolution rasterization;

(c) sending said one high resolution pixel to said output device to produce said output image if said one high resolution pixel is not said selector code;

(d) sending said one low resolution pixel to said output device to produce said output image if said one high resolution pixel is said selector code; and repeating steps (a) through (d) until all of said pixels in said high resolution rasterization and said low resolution rasterization have been obtained.

29. In an image processing system, a method of producing elements of output data at an output resolution, said output data being arranged in a two-dimensional array of pixels beginning at element (0,0) and ending at element (a,b), said method comprising the steps of:

representing a first raster image as a first group of pixels at a first resolution, said pixels of said first group being arranged in a two-dimensional array beginning at element (0,0) and ending at element (a,b);

representing a second raster image as a second group of pixels at a second resolution, said pixels of said second group being arranged in a two-dimensional array beginning at element (0,0) and ending at element (c,d), contiguous pixels on a line having the same pixel characteristics being represented as a single pixel having said pixel characteristics and a repeat pixel code, and contiguous lines having the same line characteristics being represented as a single line having said line characteristics and a repeat line code;

determining a horizontal scaling factor SX and a vertical scaling factor SY to scale said second group of pixels in, respectively, a horizontal direction and a vertical direction, to result in a representation at said output resolution;

indicating whether each element of said output data is an element of data in said first group of pixels or is an element of data in said second group of pixels;

producing pixel (i,j) of said output data from pixel (i,j) of said first group of pixels when so indicated; and producing pixel (i,j) of said output data from pixel (i DIV SX, j DIV SY) of said second group of pixels when so indicated;

wherein DIV indicates integer division with rounding; and i varies from 0 to a, and j varies from 0 to b.

30. In an image processing system, a method of producing elements of output data at an output resolution, said output data being arranged in a two-dimensional array of pixels beginning at element (0,0) and ending at element (a,b), said method comprising the steps of:

representing an input image as a first group of pixels at a first resolution, said pixels being arranged in a two-dimensional array beginning at element (0,0) and ending at element (c,d);

representing said input image as a second group of pixels at a second resolution, said pixels being arranged in a two-dimensional array beginning at element (0,0) and ending at element (e,f);

determining a first horizontal scaling factor SX1 and a first vertical scaling factor SY1 to scale said first group of pixels in, respectively, a horizontal direction and a vertical direction to result in a representation at said output resolution;

determining a second horizontal scaling factor SX2 and a second vertical scaling factor SY2 to scale said second group of pixels in, respectively, a horizontal direction and a vertical direction to result in a representation at said output resolution;

indicating whether each element of said output data is an element of data in said first group of pixels or is an element of data in said second group of pixels;

producing pixel (i,j) of said output data from pixel (i DIV SX1, j DIV SY1) of said first group of pixels when so indicated;

producing pixel (i,j) of said output data from pixel (i DIV SX2, j DIV SY2) of said second group of pixels when so indicated;

wherein DIV indicates integer division with rounding; and i varies from 0 to a, and j varies from 0 to b.

31. The method of claim 30 wherein one of said groups of pixels provide data which specify whether each element of said output data is an element in said first group of pixels or is an element of data in said second group of pixels.

32. An apparatus for producing an output image from an input image, said input image being comprised of low resolution input image elements and high resolution input image elements, said method including:

means for rasterizing said input image at a high resolution to produce a high resolution rasterization of the entire input image wherein said high resolution input image elements are represented at said high resolution;

means for rasterizing said input image at a lower resolution to produce a low resolution rasterization of said entire input image wherein said low resolution input image elements are represented at said low resolution;

means for selecting certain of said high resolution image elements from said high resolution rasterization;

means for selecting certain of said low resolution image elements from said low resolution rasterization; and means for sensing said selected high resolution image elements and said selected low resolution image elements to an output device to produce said output image at an output resolution.

33. The apparatus of claim 32 wherein said high resolution rasterization includes a first set of placeholder data representative of the portions of said input image comprising said low resolution input image elements.

34. The apparatus of claim 33 wherein said low resolution rasterization includes a second set of placeholder data representative of portions of said input image comprising said high resolution input image elements.

35. The apparatus of claim 32, further including means for scaling said low resolution rasterization to either said high resolution or said output resolution.

36. The apparatus of claim 35 including means for scaling said low resolution rasterization to the resolution of said output image.

37. The apparatus of claim 32 including means for scaling said high resolution rasterization to the resolution of said output image.

38. The apparatus of claim 32 wherein the resolutions of said high resolution rasterization and said low resolution rasterization are equal.

39. The apparatus of claim 32 wherein at least one of said rasterizations includes representations of input image elements in compressed form.

40. The apparatus of claim 32 further comprising:
means for scaling said low resolution rasterization in a first direction by a scaling factor SX wherein said scaling factor SX is equal to the resolution of said output image in said first direction divided by the resolution of said low resolution rasterization in said first direction.

41. The apparatus of claim 40 further comprising:
means for scaling said low resolution rasterization in a second direction by a scaling factor SY wherein said scaling factor SY is equal to the resolution of said output image in said second direction divided by the resolution of said low resolution rasterization in said second direction.

42. The apparatus of claim 41 wherein SX is not equal to SY.

43. The apparatus of claim 41 wherein one of said scaling factors is a non-integer number.

44. An apparatus for producing an output image at an output resolution from an input image, said input image being comprised of low resolution input image elements and high resolution input image elements, said apparatus including:
means for rasterizing said input image at a high resolution to produce a high resolution rasterization of the entire input image wherein said input image is represented as a plurality of data elements at said high resolution;

means for rasterizing said input image at a low resolution to produce a low resolution rasterization of said entire input image wherein said input image is represented as a plurality of data elements at said low resolution;

means for scaling said low resolution rasterization to the resolution of said output image; and means for merging said high resolution rasterization and said low resolution rasterization to produce said output image at said output resolution by combining certain of said high resolution data elements with certain of said low resolution data elements, said output image including said certain high resolution data elements and said certain low resolution data elements.

45. The apparatus of claim 44 wherein said high resolution rasterization includes:
high resolution image elements comprised of a plurality of data elements representative of the portions of said input image comprising said high resolution input image elements; and
a first set of placeholder data elements representative of the portions of said input image comprising said low resolution input image elements.

46. The apparatus of claim 45 wherein each of said data elements in said first set is a selector code, wherein said selector code indicates whether a data element is an element of data in said output image.

47. The apparatus of claim 46 wherein said low resolution rasterization includes:
low resolution image elements comprised of a plurality of data elements representative of the portions of said input image comprising said low resolution input image elements; and
a second set of placeholder data elements representative of the portions of said input image comprising said high resolution input image elements.

48. The apparatus of claim 47 wherein each of said data elements in said second set is an arbitrary value.

49. The apparatus of claim 47, wherein said means for merging further comprises:
(a) means for obtaining one data element from said high resolution rasterization;
(b) means for obtaining one data element from said low resolution rasterization;
(c) means for sending said one high resolution data element to said output device to produce said output image if said one high resolution data element is not said selector code;
(d) means for sending said one low resolution data element to said output device to produce said output image if said one high resolution data element is said selector code; and
means for repeating (a) through (d) until all of said data elements in said high resolution rasterization and said low resolution rasterization have been obtained.

50. The method of claim 45 wherein said merging includes:
means for providing data elements corresponding to particular portions of said output image from said high resolution rasterization simultaneously with providing data elements corresponding to respective ones of said portions from said low resolution rasterization;

means for selecting only one of each pair of said simultaneously presented data elements; and means for sending the selected one of said elements to an output device to provide portions of said output image.

51. The apparatus of claim 50 wherein contiguous data elements having the same characteristics are represented as a single data element having those characteristics and a repeat data element code.

52. The apparatus of claim 51 further including:
means for determining a scaling factor to scale said low resolution rasterization to the resolution of said output image; and
means for scaling said repeat data element code in said low resolution rasterization by said scaling factor prior to said merging.

53. The apparatus of claim 44, said means for scaling comprising:
means for scaling said low resolution rasterization in a first direction by a scaling factor SX wherein said scaling factor SX is equal to the resolution of said output image in said first direction divided by said the resolution of said low resolution rasterization in said first direction; and
means for scaling said low resolution rasterization in a second direction by a scaling factor SY wherein said scaling factor SY is equal to the resolution of said output image in said second direction divided by said resolution of said low resolution rasterization in said second direction.

54. The apparatus of claim 53 wherein one selected data element of said low resolution image produces on average SX.SY data elements in said output image.

55. The apparatus of claim 54 wherein said data elements are pixels and contiguous pixels on a line having the same characteristics are represented as a single pixel having those characteristics and a repeat pixel code.

56. The apparatus of claim 55 wherein said data elements are lines and contiguous lines having the same characteristics are represented as a single line having those characteristics and a repeat line code.

57. The apparatus of claim 56, said means for scaling further including:
means for scaling said repeat pixel code in said low resolution rasterization by said scaling factor SX; and
means for scaling said repeat line code in said low resolution rasterization by said scaling factor SY.

58. The apparatus of claim 57 wherein said first direction is the horizontal direction and said second direction is the vertical direction.

59. An apparatus for producing an output image from an input image, said input image being comprised of low resolution input image elements and high resolution input image elements, said apparatus including:
means for rasterizing said input image at a high resolution to produce a high resolution rasterization of the entire input image wherein said input image is represented as a plurality of pixels at said high resolution;
means for rasterizing said input image at a low resolution to produce a low resolution rasterization of said entire input image wherein:
said input image is represented as a plurality of pixels at said low resolution wherein:
contiguous pixels on a line having the same characteristics are represented as a single pixel having those characteristics and a repeat pixel code, and
contiguous lines having the same characteristics are represented as a single line having those characteristics and a repeat line code;

means for scaling said repeat pixel code in said low resolution rasterization by a scaling factor SX wherein said scaling factor SX is equal to the resolution of said output image in a horizontal direction divided by said low resolution in said horizontal direction;

means for scaling said repeat line code in said low resolution rasterization by a scaling factor SY wherein said scaling factor SY is equal to the resolution of said output image in a vertical direction divided by said low resolution in said vertical direction;

means for merging said high resolution rasterization and said low resolution rasterization by:
(a) obtaining one pixel from said high resolution rasterization;
(b) obtaining one pixel from said low resolution rasterization;
(c) sending said high resolution pixel to said output device to produce said output image if said one high resolution pixel is not said selector code;
(d) sending said low resolution pixel to said output device to produce said output image if said one high resolution pixel is said selector code; and
repeating steps (a) through (d) until all of said pixels in said high resolution rasterization and said low resolution rasterization have been obtained.

60. In an image processing system, an apparatus for producing elements of output data at a first resolution, said output data being arranged in a two-dimensional array of pixels beginning at element (0,0) and ending at element (a,b), said apparatus comprising:
means for representing an input image as a first group of pixels at said first resolution, said pixels being arranged in a two-dimensional array beginning at element (0,0) and ending at element (a,b);
means for representing said input image as a second group of pixels at a second resolution, said pixels being arranged in a two-dimensional array beginning at element (0,0) and ending at element (c,d);
means for determining a horizontal scaling factor SX and a vertical scaling factor SY to scale said second group of pixels in, respectively, a horizontal direction and a vertical direction to result in a representation at said first resolution;
means for indicating whether each element of said output data is an element of data in said first group of pixels or is an element of data in said second group of pixels;
means for producing pixel (i,j) of said output data from pixel (i,j) of said first group of pixels when so indicated; and
means for producing pixel (i,j) of said output data from pixel (i DIV SX, j DIV SY) of said second group of pixels when so indicated;
wherein DIV indicates integer division with rounding; and i varies from 0 to a, and j varies from 0 to b.

61. The apparatus of claim 60 wherein one of said groups of pixels provide data which specify whether each element of said output data is an element in said first group of pixels or is an element of data in said second group of pixels.

62. In an image processing system, an apparatus for producing elements of output data at an output resolution, said output data being arranged in a two-dimensional array of pixels beginning at element (0,0) and ending at element (a,b), said apparatus comprising:
- means for representing an input image as a first group of pixels at a first resolution, said pixels being arranged in a two-dimensional array beginning at element (0,0) and ending at element (c,d);
- means for representing said input image as a second group of pixels at a second resolution, said pixels being arranged in a two-dimensional array beginning at element (0,0) and ending at element (e,f);
- means for determining a first horizontal scaling factor SX1 and a first vertical scaling factor SY1 to scale said first group of pixels in, respectively, a horizontal direction and a vertical direction to result in a representation at said output resolution;
- means for determining a second horizontal scaling factor SX2 and a second vertical scaling factor SY2 to scale said second group of pixels in, respectively, a horizontal direction a vertical direction to result in a representation at said output resolution;
- means for indicating whether each element of said output data is an element of data in said first group of pixels or is an element of data in said second group of pixels;
- means for producing pixel (i,j) of said output data from pixel (i DIV SX1, j DIV SY1) of said first group of pixels when so indicated;
- means for producing pixel (i,j) of said output data from pixel; (i DIV SX2, j DIV SX2) of said second group of pixels when so indicated;

wherein DIV indicates integer division with rounding; and i varies from 0 to a, and j varies from 0 to b.

63. The apparatus of claim 62 wherein one of said groups of pixels provide data which specify whether each element of said output data is an element in said first group of pixels or is an element of data in said second group of pixels.

* * * * *

UNITED STATES PATENT AND TRADEMARK OFFICE
CERTIFICATE OF CORRECTION

PATENT NO. : 5,239,625
DATED : August 24, 1993
INVENTOR(S) : Mitchell Bogart, et. al.

It is certified that error appears in the above-indentified patent and that said Letters Patent is hereby corrected as shown below:

Column 4, line 49, "a input" should be --an input--.
Column 8, line 29, "intitialized" should be --initialized--.
Column 9, line 25, "brings" should be --bring--.
Column 16, lines 18-19, Claim 16, "detector" should be --selector--.
Column 18, line 68, Claim 32, "method" should be --apparatus--.
Column 19, line 6, Claim 32, "lower" should be --low--.
Column 19, line 17, Claim 32, "sensing" should be --sending--.
Column 24, line 1, Claim 62, after 'horizontal direction", insert --and--.
Column 24, line 11, Claim 62, "j DIV SX2" should be --J DIV SY2--.

Signed and Sealed this

Twenty-sixth Day of April, 1994

Attest:

BRUCE LEHMAN

*Attesting Officer*  *Commissioner of Patents and Trademarks*